Feb. 3, 1970     I. KAUFMAN     3,493,899

MAGNETOSTRICTIVE TRANSDUCER

Filed March 17, 1967

Irving Kaufman
INVENTOR

BY *Edward Dugas*

AGENT

3,493,899
MAGNETOSTRICTIVE TRANSDUCER
Irving Kaufman, Tempe, Ariz., assignor to TRW Inc., Redondo Beach, Calif., a corporation of Ohio
Filed Mar. 17, 1967, Ser. No. 623,958
Int. Cl. H03h 7/30, 9/22
U.S. Cl. 333—30                                  7 Claims

ABSTRACT OF THE DISCLOSURE

A sandwich structure of alternate layers of magnetostrictive magnetic material and of material which will not couple from magnetic fields to acoustic fields is excited with a magnetic field of a predetermined frequency, which in turn generates an acoustic field of the same frequency. Each layer of material is of a thickness that is equal to one-half the acoustic wavelength corresponding to the frequency of the signal to be propagated through the layers of material.

BACKGROUND OF THE INVENTION

This invention relates generally to transducers and more particularly relates to a novel transducer for translating magnetic wave energy into acoustic wave energy.

One known method of transducing from electromagnetic to acoustic waves involves the use of a plate of piezoelectric material such as single crystal quartz which is acoustically bonded to an acoustic or mechanical waveguide. By impressing a voltage across the plate, acoustic waves are generated.

In co-pending U.S. application Ser. No 509,583, entitled "Hypersonic Transducer," filed Nov. 24, 1965 by Eugene C. Crittenden, assigned to TRW Inc., the assignee of the present invention, there is disclosed a transducer for translating electromagnetic wave energy to acoustic wave energy at wavelengths as short as microwave. In that application, a piezoelectric device is produced having alternating thin regions of high and low electrical impedance, with each region being equal in width along the axis of sound propagation to one-half wavelength of the acoustical signal to be generated. The applied voltage is divided equally across the high impedance regions, with little or no voltage appearing across the low impedance region. The combined effect of the acoustic waves produced in the high impedance regions is the same as if the entire voltage appeared across a single half-wave element. One advantage of such a device, from the aspect of the electrical circuit, is that the effective electrical capacitance of the transducer is reduced over that of a transducer of about the same efficiency but only one-half wavelength thick.

It is also possible to generate acoustic waves in a rod of material (at microwave frequencies) by plating a thin film of magnetic material on an oriented rod. An R.F. magnetic field, when applied to the magnetic material, preferably in the presence of a D.C. magnetic field of correctly chosen strength, causes excitation of the elementary magnetic dipoles of the material (sometimes called the "spins"); so that they precess, or oscillate, at the applied R.F. frequency. Because of the magnetoelastic coupling between spins and mass points in the material, sound waves (sometimes called phonons) are generated. These phonons are then transmitted to the acoustic rod through which they propagate. If the thickness of the magnetic film is less than one-half the acoustic wavelength of the film, the phonons excited from the various layers of depth of the film add. However, if the film thickness is made larger than one-half the wavelength, the layers that lie above the one-half wavelength level produce acoustic excitation which subtracts from the excitation below the one-half level. In practice, however, the amount of coupling that can be produced by a film of thickness of one-half the acoustical wavelength is insufficient for efficient conversion from magnetic to acoustic wave. It is therefore highly desirable to have a magnetoacoustic transducer wherein the magnetic material has a wavelength equal to or less than one-half the acoustic wavelength to be propagated and wherein the produced coupling reaches a higher degree of efficiency than heretofore attained.

SUMMARY OF THE INVENTION

Accordingly, it is an object of the present invention to provide a novel transducer which overcomes the disadvantages of prior art devices and which is capable of efficiently translating magnetic energy to acoustical energy.

It is another object of the present invention to provide a transducer incorporating novel energy translating apparatus which provides improved energy translation at selected microwave frequencies.

In a preferred embodiment of the invention, the problem as defined above is efficiently solved by sandwiching alternate layers of magnetic material with a material which will not couple from magnetic fields to acoustic fields, with each layer of material having a thickness that is equal to or less than one-half the acoustic wavelength of that particular material. A magnetic field source is used to excite the magnetic material so as to generate phonons in an acoustic waveguide, which is positioned adjacent to and in acoustic contact with the layers of material. Since the layers that have no interaction between magnetic and acoustic fields contribute no acoustic excitation, they cannot subtract from the acoustic excitation of the magnetic material layers. The acoustic excitation signals from the magnetic layers therefore add so that the efficiency of conversion from magnetic to acoustic energy (or vice versa) is improved tremendously. The device also operates as a very compact microwave filter (i.e., it will only pass frequencies in a very narrow range), while at the same time delaying the signal by times of the orders of micoseconds.

The aforementioned and other objects of the present invention will become more apparent when taken in conjunction with the following description and drawings.

DESCRIPTION OF THE PREFERRED EMBODIMENTS

Figure 1:
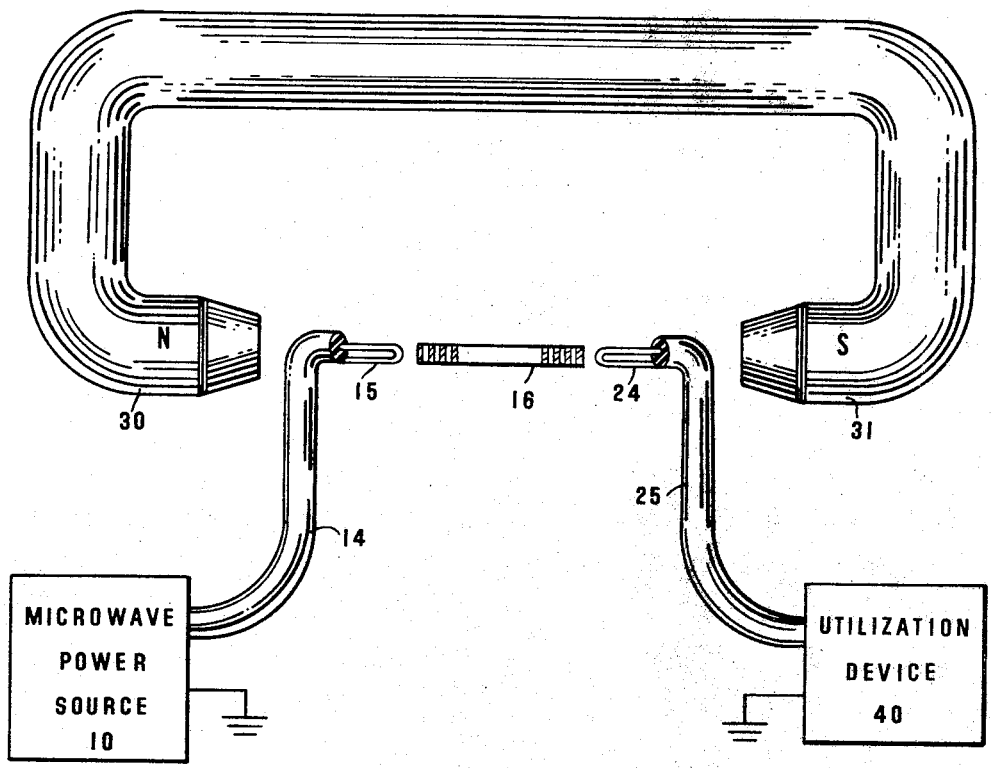
FIGURE 1 illustrates a sectioned view of a preferred embodiment of the present invention.
Figure 2:
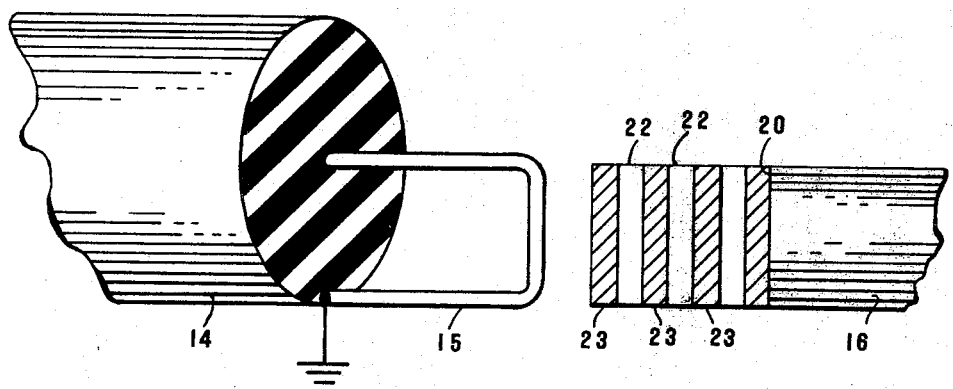
FIGURE 2 is an enlarged sectioned view of a portion of the embodiment of FIGURE 1.

Referring now to FIGURES 1 and 2, a source 10 of radio frequency electromagnetic energy such as microwave energy is coupled by a coupling means such as a coaxial line 14 and a loop 15 to an acoustic waveguide 16. The acoustic waveguide 16 may be a solid cylindrical rod of quartz or other acoustic transmitting material. The end surfaces 20 (one enlarged end view shown in FIGURE 2) of the acoustic waveguide 16 are coated with a sandwich structure of alternate thin film layers 22 and 23 of magnetic material (which will couple from magnetic fields to acoustic fields), and of material which will not couple from magnetic fields to acoustic fields, respectively. Each of the layers 22 and 23 has a thickness equal to one-half wavelength, $\lambda_s/2$, where $\lambda_s$ is the acoustic wavelength in the particular material.

The layers 22 and 23 may be formed by vacuum deposition or other suitable means such as electroplating, starting with the magnetic layer 22, then a non-coupling layer 23, another magnetic layer 22, and so on, with the final layer deposited being either a magnetic layer or non-coupling layer.

Some of the materials that may be used for the non-coupling layers 23 are gold, aluminum, silicon dioxide, germanium and any other material that will not couple magnetic fields to acoustic fields. Nickel or permalloy may be used for the magnetic film 22 with good results. In case of a structure that has many layers, so that skin depth could be a problem, non-metallic films rould be used for both active and inactive portions. Then, the magnetically active portions could be ferrite films, the inactive portions $SiO_2$. A coupling loop 24 couples the energy transmitted by the acoustic waveguide 16 and the sandwiched end layers to a utilization device 40 via a co-axial line 25. A D.C. magnetic source comprised of pole pieces 30 and 31 provides a biasing D.C. magnetic field that is substantially parallel to the longitudinal central axis of the waveguide 16. The strength of the magnetic field is chosen so that when it is combined with the R.F. magnetic field from the power source 10, excitation of the elementary magnetic dipoles of the material 22 occurs.

In operation, a high-frequency electromagnetic signal, generated by the source 10 and having a frequency equal to that of the acoustic wave to be generated is coupled to the acoustic waveguide 16. The magnetic component of the electromagnetic field is coupled to the sandwiched structure formed by the alternate layers 22 and 23. The magnetic field created around the coupling loop 15 passes through the magnetic films 23 in a substantially parallel direction. This field excites the magnetization (i.e., the magnetic dipoles) into precession at the applied frequency. Because of the magnetoelastic coupling referred to above, the oscillatory magnetization produces phonons of the same frequency which are then transmitted to rod 16. The alternating magnetic fields therefore produce acoustic vibrations in each layer of the magnetic film having an acoustic wavelength equal to twice the thickness of each layer. Since the material layers are at least a half-wavelength apart, the individual acoustic vibrations produce a composite acoustic signal of greater amplitude than any of the individual layers. The acoustical waves propagated through the waveguide 16 may then be coupled to a utilization device such as a resonant cavity for further use.

The advantages of the transducer of the present invention are:

(1) The amount of acoustic power generated for a given amount of R.F. excitation (as from the shortened co-axial line) varies approximately as the square of the number of magnetically active half-wave sections performing the coupling. Thus, for a transducer composed of 100 magnetically active sections, the coupling is increased over that from a single section by a factor of 10,000 or 40 decibels; and (2) By using a *large number* of half-wave sections, the device becomes a very compact microwave frequency selective filter that will couple effectively only to signals of frequencies in the immediate vicinity of the frequency at which the layers are half of an acoustic wavelength thick.

While I have discussed here only the use of the multilayer magnetic structure as a transducer from electromagnetic to acoustic energy, it will be appreciated that the same device can also be used as a transducer for converting acoustic to electromagnetic energy.

While there has been shown what are considered to be the preferred embodiments of the invention, it will be manifest that many changes and modifications may be made therein without departing from the essential spirt of the invention. It is intended, therefore, in the annexed claims, to cover all such changes and modifications as fall within the true scope of the invention.

What is claimed is:

1. A transducer for translating magnetic microwave energy into acoustic wave energy comprising:
    (a) a sandwich structure of alternate layers of magnetostrictive magnetic material and material that will not couple from magnetic fields to acoustic fields, said layers being placed in contact with each other, said sandwich structure having a longitudinal axis;
    (b) means for applying a steady magnetic field to said magnetic material, said magnetic field extending substantially parallel to said longitudinal axis;
    (c) means for exciting said sandwich structure with a magnetic microwave field extending substantially parallel to said alternate layers; and
    (d) means for extracting the magnetic microwave field energy of said sandwich structure.

2. A transducer as defined in claim 1 wherein each of said layers has a width substantially equal to one-half the wavelength of the acoustic wave to be propagated.

3. A transducer as defined in claim 1 wherein each of said layers is a thin film.

4. A transducer as defined in claim 1 wherein a rod of acoustic transmitting material is interposed between two sets of alternate layers disposed at the ends of said transducer.

5. A transducer as defined in claim 1 wherein said material that will not couple from magnetic fields to acoustic fields is selected from the group consisting of gold, aluminum, silicon dioxide and germanium.

6. A transducer for translating magnetic microwave energy into acoustic wave energy comprising:
    (a) a first sandwich structure, and a second sandwich structure, each consisting of alternate layers of magnetostrictive magnetic material and material that will not couple from magnetic fields to acoustic fields, said sandwich structures having a longitudinal axis;
    (b) a rod of acoustic transmitting material acoustically attached to and disposed between said first and second set of sandwich structures;
    (c) means for generating a steady magnetic field substantially parallel to said longitudinal axis for biasing said magnetic material;
    (d) means coupled to said first sandwich structure, for exciting said first sandwich structure with a magnetic microwave field extending substantially parallel to said layers; and
    (e) utilization means coupled to said second sandwich structure for extracting the magnetic microwave field energy.

7. A transducer as defined in claim 6 wherein said material that will not couple from magnetic fields to acoustic fields is selected from the group consisting of gold, aluminum, silicon dioxide and germanium.

References Cited
UNITED STATES PATENTS

| | | | |
|---|---|---|---|
| 3,353,118 | 11/1967 | Olson et al. | 333—30 X |
| 3,036,232 | 6/1962 | Murden | 333—71 X |
| 3,351,875 | 11/1967 | Midgley | 333—30 X |

HERMAN KARL SAALBACH, Primary Examiner

T. J. VEZEAU, Assistant Examiner

U.S. Cl. X.R.

333—71